(12) United States Patent
Powell et al.

(10) Patent No.: US 7,793,323 B2
(45) Date of Patent: Sep. 7, 2010

(54) DIGITAL CINEMA SYSTEM HUB FOR MULTIPLE EXHIBITOR DISTRIBUTION

(75) Inventors: Mark L. Powell, Manhattan Beach, CA (US); David Confair, Arlington, VA (US); Michael David Repp, New Market, MD (US)

(73) Assignee: The Boeing Company, Chicago, IL (US)

( * ) Notice: Subject to any disclaimer, the term of this patent is extended or adjusted under 35 U.S.C. 154(b) by 2202 days.

(21) Appl. No.: 10/425,325

(22) Filed: Apr. 29, 2003

(65) Prior Publication Data

US 2003/0204851 A1     Oct. 30, 2003

Related U.S. Application Data

(60) Provisional application No. 60/376,241, filed on Apr. 29, 2002.

(51) Int. Cl.
*H04N 7/20* (2006.01)
(52) U.S. Cl. .................. 725/63; 455/13.1; 725/64; 725/65; 725/66
(58) Field of Classification Search .......... 352/123, 352/133; 725/74, 78, 105, 88, 90; 455/3.03, 455/3.06, 8, 9, 63.1, 65, 504, 505
See application file for complete search history.

(56) References Cited

U.S. PATENT DOCUMENTS

| | | | | |
|---|---|---|---|---|
| 5,511,079 | A | * | 4/1996 | Dillon .................... 714/774 |
| 5,594,490 | A | * | 1/1997 | Dawson et al. ............. 725/67 |
| 5,754,543 | A | * | 5/1998 | Seid ...................... 370/351 |
| 5,867,109 | A | * | 2/1999 | Wiedeman ............... 455/13.1 |
| 5,870,475 | A | * | 2/1999 | Allan et al. .............. 380/282 |
| 5,924,014 | A | * | 7/1999 | Vanden Heuvel et al. .. 455/13.1 |
| 5,982,363 | A |   | 11/1999 | Naiff |
| 6,141,530 | A |   | 10/2000 | Rabowsky |

(Continued)

FOREIGN PATENT DOCUMENTS

WO      WO 99/59335      11/1999

(Continued)

OTHER PUBLICATIONS

Morley, S., "Making Digital Cinema Actually Happen—What it takes and Who's Doing It." QUALCOMM, Incorporated, 17 pp., Oct. 31, 1998.

(Continued)

*Primary Examiner*—Joseph P Hirl
*Assistant Examiner*—Joshua Taylor
(74) *Attorney, Agent, or Firm*—Gates & Cooper LLP (57) ABSTRACT

A method and apparatus for transmitting a media program comprising audiovisual data. The method comprises the steps of transmitting the audiovisual data from a ground center to a satellite; transponding the audiovisual data to a ground-based hub; and transmitting the audiovisual data from the ground-based hub to a display entity if the satellite is obscured from the display entity. The apparatus comprises a ground transmitter transmitting the audiovisual data from a ground center to a satellite; satellite for transponding the audiovisual data; and a ground-based hub, having a receiver for receiving the transponded audiovisual data and a hub transmitter for transmitting the audiovisual data from the ground-based hub to a display entity if the satellite is obscured from the display entity.

4 Claims, 5 Drawing Sheets

U.S. PATENT DOCUMENTS

| | | | |
|---|---|---|---|
| 6,229,895 B1 * | 5/2001 | Son et al. ................... 380/200 |
| 6,332,139 B1 * | 12/2001 | Kaneko et al. ................. 707/6 |
| 6,336,030 B2 * | 1/2002 | Houston et al. ............ 455/13.2 |
| 6,384,893 B1 | 5/2002 | Mercs et al. |
| 6,748,597 B1 * | 6/2004 | Frisco et al. ................... 725/76 |
| 6,836,658 B1 * | 12/2004 | Sharon et al. ............... 455/429 |
| 7,181,345 B2 * | 2/2007 | Rosenfeld et al. .............. 702/3 |
| 7,194,757 B1 * | 3/2007 | Fish et al. ................... 725/121 |
| 2001/0003918 A1 | 6/2001 | Sibley et al. |
| 2001/0039662 A1 | 6/2001 | Sibley |
| 2001/0039663 A1 | 6/2001 | Sibley |
| 2001/0039664 A1 | 6/2001 | Sibley |
| 2001/0053700 A1 | 6/2001 | Sibley |
| 2002/0095679 A1 * | 7/2002 | Bonini ......................... 725/74 |
| 2002/0129371 A1 | 9/2002 | Emura et al. |
| 2003/0026424 A1 * | 2/2003 | McGarrahan et al. ....... 380/255 |
| 2004/0210928 A1 * | 10/2004 | Hamzy et al. ................. 725/31 |

FOREIGN PATENT DOCUMENTS

WO     WO9959335    * 11/1999

OTHER PUBLICATIONS

Stromberg, M., "Secure Content Protection: An Overview of the Proposed Security Mechanisms in Digital Cinema", KTH Advanced Media Technology Lab, Online! Sep. 20, 2001, Stockholm, XP-002249975, retrieved from the Internet: URL: www.amt.kth.es on Aug. 1, 2003, 17 pp.

Kirovski et al., "Digital Rights Management for Digital Cinema," Inter. Symp. on Optical Science & Tech.—Security in Imaging Theory & Applications, San Diego, CA, Jul. 2001, 16 pages.

National Association of Theatre Owners; "Digital Cinema User Requirements," Feb. 22, 2002, pp. 13.

Hose et al., "Data Transport and Processing in a Digital Cinema Theatre System," Qualcomm Incorporated from the 36th Advanced Motion Imaging Conference, Feb. 7-9, 2002, 21 pages.

* cited by examiner

DIGITAL CINEMA SYSTEM HUB FOR MULTIPLE EXHIBITOR DISTRIBUTION

CROSS-REFERENCE TO RELATED APPLICATIONS

This application claims benefit of U.S. Provisional Patent Application No. 60/376,241, entitled "DIGITAL CINEMA SYSTEM HUB FOR MULTIPLE EXHIBITOR DISTRIBUTION," by Mark L. Powell, David Confair, and Michael David Repp, filed Apr. 29, 2002, which application is hereby incorporated by reference herein.

This application is related to the following co-pending and commonly assigned patent application(s), all of which applications are incorporated by reference herein:

U.S. Provisional Application Ser. No. 60/376,105, entitled "SECURE DATA CONTENT DELIVERY SYSTEM FOR MULTIMEDIA APPLICATIONS UTILIZING BANDWIDTH EFFICIENT MODULATION", by Charles F. Stirling, Bernard M. Gudaitis, William G. Connelly, and Catherine C Girardey, filed Apr. 29, 2002; and U.S. Provisional Application Ser. No. 60/376,244, entitled "METHOD TO SECURELY DISTRIBUTE LARGE DIGITAL VIDEO/DATA FILES WITH OPTIMUM SECURITY," by Ismael Rodriguez and James C Campanella, filed Apr. 29, 2002;

U.S. Utility patent application Ser. No. 10/213,396, filed Aug. 6, 2002, by inventor Joseph S. Ng, entitled "BANDWIDTH-EFFICIENT AND SECURE METHOD TO COMBINE MULTIPLE LIVE EVENTS TO MULTIPLE EXHIBITORS" (now abandoned), which itself claims the benefit of U.S. Provisional Patent Application Ser. No. 60/376,333, filed Apr. 29, 2002, by inventor Joseph S. Ng, entitled "BANDWIDTH EFFICIENT AND SECURE METHOD TO COMBINE MULTIPLE LIVE EVENTS TO MULTIPLE EXHIBITORS", now abandoned;

U.S. Utility patent application Ser. No. 10/178,602, filed Jun. 24, 2002, by inventor Michael A. Enright, entitled "METHOD AND APPARATUS FOR DECOMPRESSING AND MULTIPLEXING MULTIPLE VIDEO STREAMS IN REAL-TIME" (now abandoned), which claims the benefit of U.S. Provisional Patent Application Ser. No. 60/376,254, filed Apr. 29, 2002, by inventor Michael A. Enright, entitled "METHOD TO DECOMPRESS AND MULTIPLEX MULTIPLE VIDEO STREAMS IN REAL-TIME" now abandoned;

U.S. Provisional Patent Application Ser. No. 60/376,087, filed Apr. 29, 2002, by inventor Mary A. Spio, entitled "METHODOLOGY FOR DISPLAY AND DISTRIBUTION OF LIVE CINEMA GRADE CONTENT IN REAL TIME";

U.S. Utility patent application Ser. No. 10/360,019, filed Feb. 7, 2003, now U.S. Pat. No. 7,690,021, issued Mar. 30, 2010, by inventors Joseph S. Ng and Robyn M. Akers, entitled "COMBINING MULTIPLE SIMULTANEOUS SOURCE CINEMA TO MULTIPLE EXHIBITOR RECEIVERS", which claims the benefit of U.S. Provisional Patent Application Ser. No. 60/376,240, filed Apr. 29, 2002, by inventors Joseph S. Ng and Robyn M. Akers, entitled "COMBINING MULTIPLE SIMULTANEOUS SOURCE CINEMA TO MULTIPLE EXHIBITOR RECEIVERS";

U.S. Provisional Patent Application Ser. No. 60/376,216, filed Apr. 29, 2002, by inventors Ismael Rodriguez and Robyn M. Akers, entitled "SECURE METHOD TO INTEGRATE USE MANAGEMENT AND CONDITIONAL ACCESS INTO A SINGLE DATABASE"; and U.S. Provisional Patent Application Ser. No. 60/376,243, filed Apr. 29, 2002, by inventors Bernard Mark Gudaitis and William G. Connelly, entitled "ARCHITECTURE CONTAINING EMBEDDED COMPRESSION AND ENCRYPTION ALGORITHMS WITHIN THE DATA FILE."

BACKGROUND OF THE INVENTION

1. Field of the Invention

The present invention relates to systems and methods for delivering media to multiple exhibitors. Particularly, the present invention relates to such systems and methods for use in digital cinema applications.

2. Description of the Related Art

The methods by which movies and other media programs that are distributed to theaters for display to audiences have not substantially changed in over 75 years. Celluloid copies of such movies are distributed to each theater in advance of the first showing, and the same copy is repeatedly displayed for audiences until the movie is excessively worn, the license expires, or the theater stops showing the movie in favor of a more popular movie.

There are several problems with this process. First, the process of manually and securely distributing physical celluloid copies of each movie is costly. Second, it is time consuming. This is especially important in circumstances where last minute changes must be made to the film before release. Such time concerns often prohibit that any such changes be made.

There is therefore a need for a method and system for distributing media programs in a rapid and inexpensive manner. As will be described further herein, the present invention solves that need by providing for the distribution of digital copies of media programs via a satellite or other high bandwidth medium. For example, digital cinema systems provide the ability for distributing digital copies of motion picture "films" electronically directly to theatres running exhibitor systems.

However, the use of digital cinema systems presents additional challenges. For example, some theaters and other exhibitors may not have the capability to point an antenna at a satellite. An unobstructed line-of-sight (LOS) to the satellite is necessary to acquire the data. Some examples of problems theatres could experience include no southerly LOS view to the geo-satellite, building obstructions, no roof access or other architectural impacts.

What is needed is a system that transmitting media programs such as digitized films to remote locations without an unobstructed LOS to the satellite transmitting the media program. What is also needed is a system that provides the data to the exhibitor systems with a high degree of reliability and security, even under poor weather conditions. The present invention satisfies that need.

SUMMARY OF THE INVENTION

To address the requirements described above, the present invention discloses a method and apparatus for transmitting a media program comprising audiovisual data. The method comprises the steps of transmitting the audiovisual data from a ground center to a satellite; transponding the audiovisual data to a ground-based hub; and transmitting the audiovisual data from the ground-based hub to a display entity if the satellite is obscured from the display entity. In one embodiment, the apparatus comprises a ground transmitter transmitting the audiovisual data from a ground center to a satellite; satellite for transponding the audiovisual data; and a ground-based hub, having a receiver for receiving the transponded audiovisual data and a hub transmitter for transmitting the audiovisual data from the ground-based hub to a display entity if the satellite is obscured from the display entity.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, byway of illustration, several embodiments of the present invention. It is understood that other embodiments may be utilized and structural changes may be made without departing from the scope of the present invention.

Figure 1A:
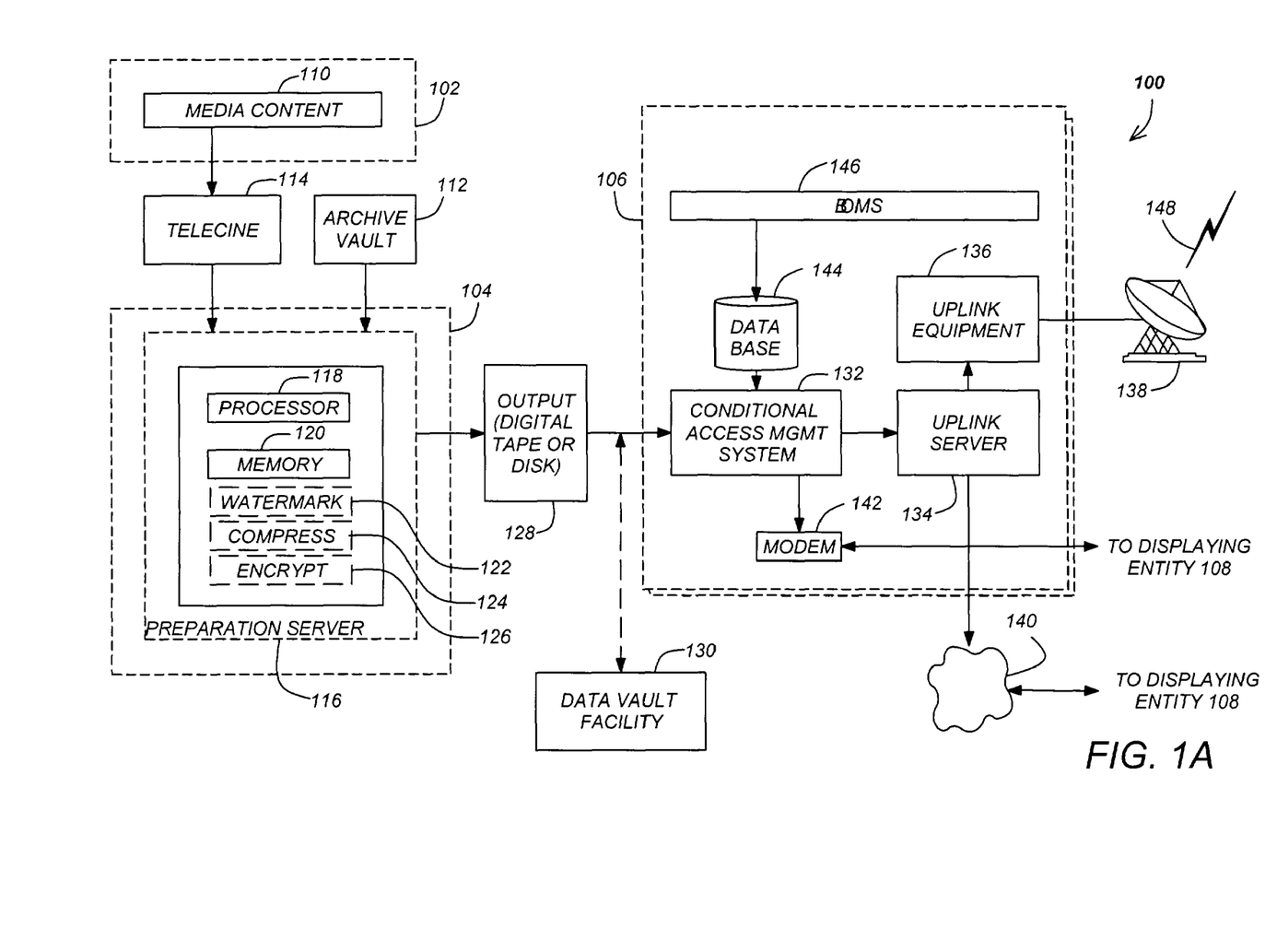
FIGS. 1A & 1B depict a top-level functional block diagram of one embodiment of a typical media program distribution system.
Figure 1B:
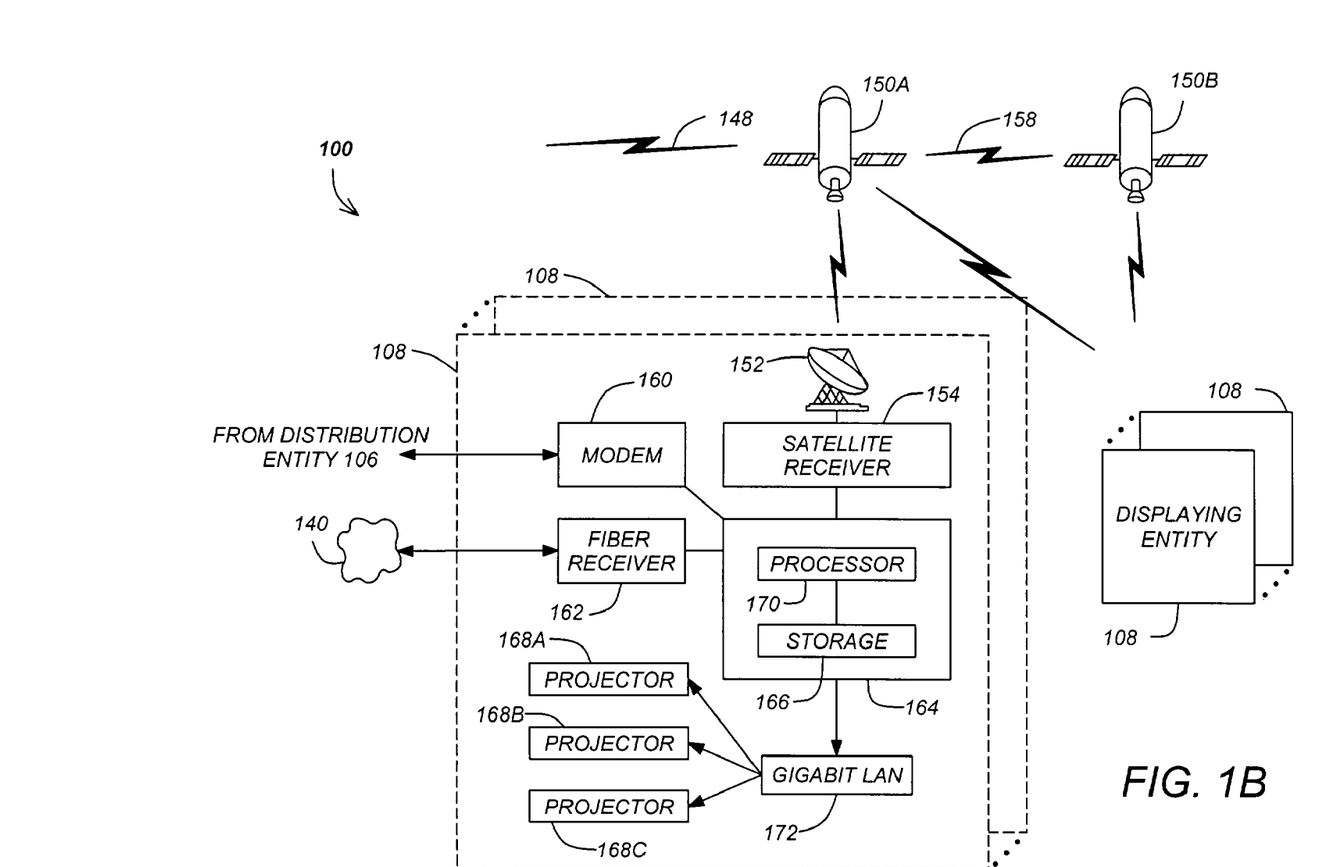

FIGS. 1A and 1B depict a top-level functional block diagram of one embodiment of a media program distribution system 100. The media distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 may be telecined by processor 114 to format the media program as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can add watermarking 122 and/or encrypt 126 the media content 110 to protect it. In addition, the preparation processor can also apply compression 124 to the media content 110. Once prepared, the output media content 128 can be transferred to digital tape or a disk (e.g. a DVD, laserdisk or similar medium). The output media content 128 can then be archived in a data vault facility 130 until it is needed.

When needed, the prepared output media content 128 is then provided to the distribution entity 106 (alternatively referred to hereinafter as the network operations center, or NOC). Although illustrated as separate entities, the protection entity 104 and the distribution entity 106 can be combined into a single entity, thus ameliorating some security concerns regarding the transmission of the output media content 128.

The distribution entity 106 includes a conditional access management system (CAMS) 132 (also referred to as a configuration management engine), that accepts the output media content 128, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities 108 (also referred to as exhibitor systems) (shown in FIG. 1B). This is accomplished by the uplink equipment 136 and uplink antenna 138. Also, as shown, in addition or in the alternative to transmission via satellite, the media program can be provided to the displaying entity 108 via a forward channel fiber network 140. Additionally, information may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network Typically, the back channel provides data communication for administration functions (e.g. billing, authorization, usage tracking, etc.), while the satellite network provides for transfer of the output media content 128 to the displaying entities 108.

The output media content 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Turning to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to a second distribution entity 108B and/or to another satellite 150B via crosslink 158. Typically, satellite 150B services a different terrestrial region than satellite 150A, and transmits data to displaying entities 108 in other geographical locations.

Figure 2:
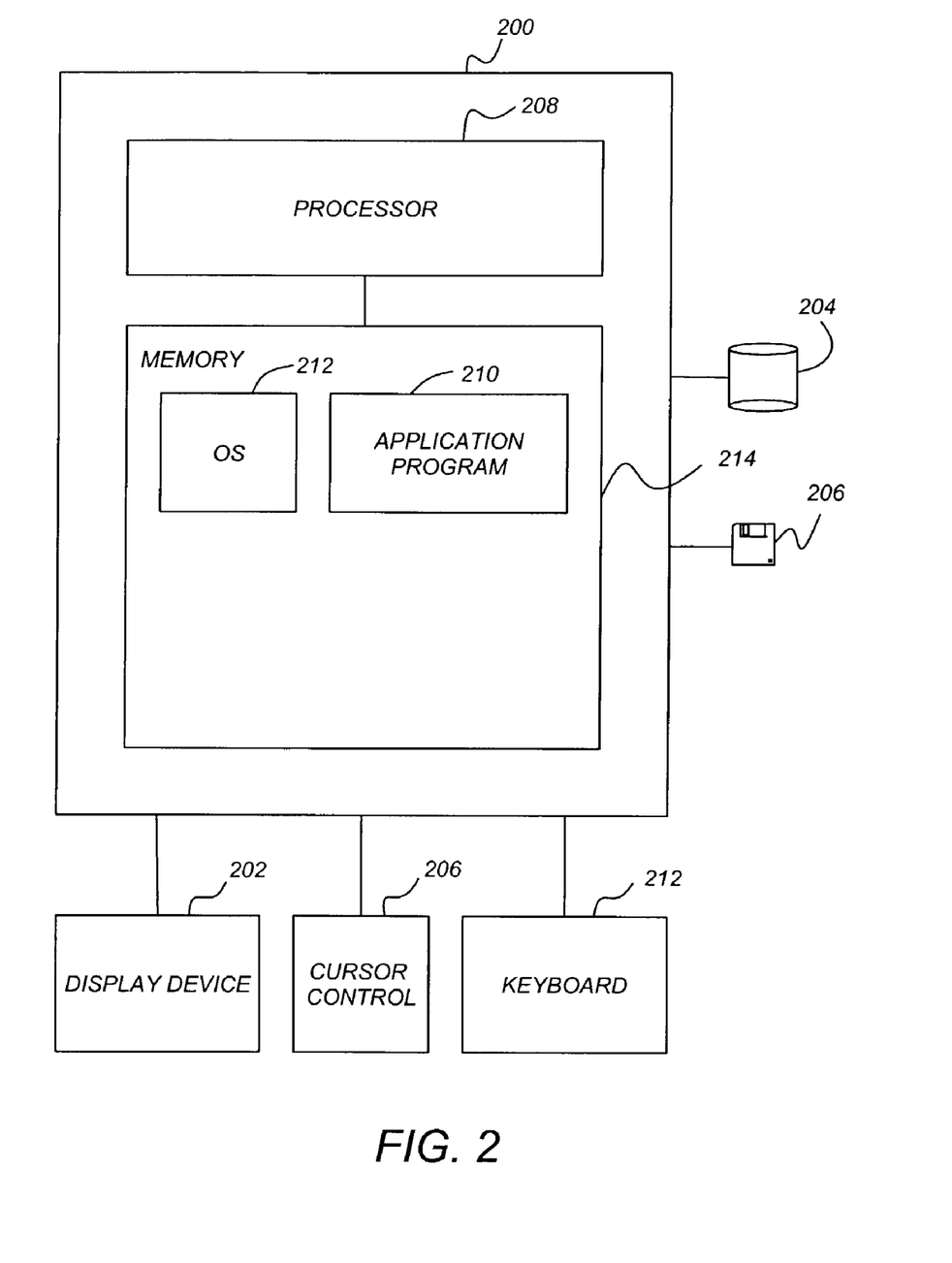
FIG. 2 is a functional block diagram of a computer system that can be used to perform the operations of the media preparation processor.

A typical displaying entity 108 comprises a modem 160 (and may also include a fiber receiver 162) for receiving and transmitting information through the back channel (i.e., via an communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output media content 128 and other information may be accepted into a processing system 164 (also referred to as a content server) such as a server or computer similar to that which is illustrated in FIG. 2 (see description below). The output media content 128 may then be stored in the storage device 166 for later transmission to displaying systems (e.g., digital projectors) 168A-168C. Before storage, the output media content 128 can be decrypted to remove transmission encryption (e.g. any encryption applied by the CAMS 132), leaving the encryption applied by the preparation processor 116.

When the media content 110 is to be displayed, final decryption techniques are used on the output media content 128 to substantially reproduce the original media content 110 in a viewable form which is provided to one or more of the displaying systems 168A-168C. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 110 can be communicated to the displaying systems 168A-168C over an independently encrypted connection, such as on a gigabit LAN 172.

FIG. 2 is a functional block diagram of a computer system 200 that can be used to perform the operations of the media preparation processor 116 and processing system 164. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 100.

Generally, the computer 200 operates under control of an operating system 212 stored in the memory 214, and interfaces with the user to accept inputs and commands and to present results on the display 202 and provide data to other systems coupled to the computer system 200. An application program 210, stored in memory 214 accesses and manipulates data stored in the memory 214 of the computer 200. The computer 200 also optionally comprises an external communication device such as a modem, satellite link, Ethernet card, or other device for communicating with other computers.

In one embodiment, instructions implementing the operating system 212, the application program 210 are tangibly embodied in a computer-readable medium, e.g., data storage device 204, 206, which could include one or more fixed or removable data storage devices, such as a zip drive, floppy disc drive, hard drive, CD-ROM drive, tape drive, etc. Further, the operating system 212 and the computer program 210 are comprised of instructions which, when read and executed by the computer 102, causes the computer 200 to perform the steps necessary to implement and/or use the present invention. Computer program 210 and/or operating instructions may also be tangibly embodied in memory 214 and/or data communications devices, thereby making a computer program product or article of manufacture according to the invention. As such, the terms "article of manufacture," "program storage device" and "computer program product" as used herein are intended to encompass a computer program accessible from any computer readable device or media.

Figure 3:
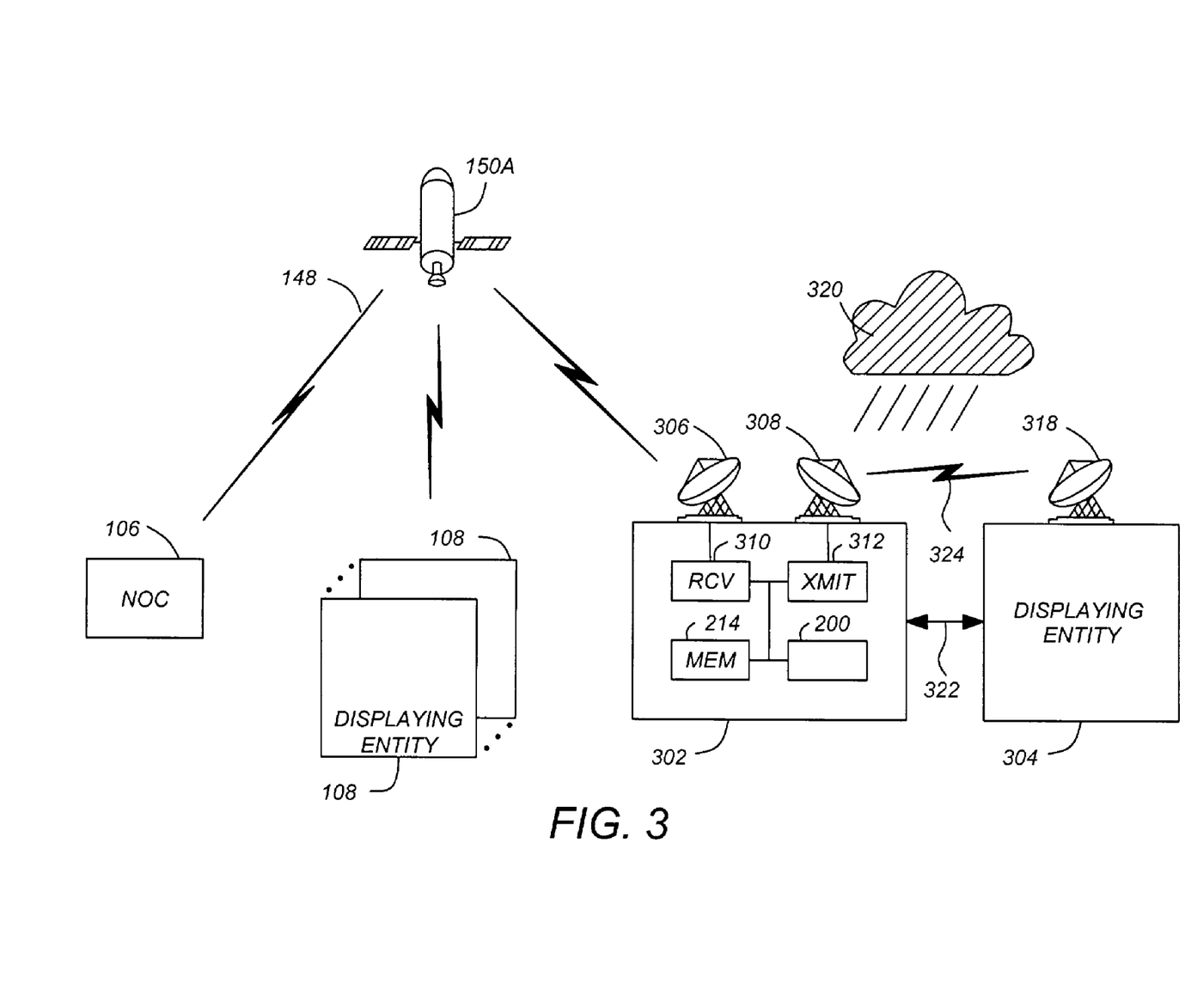
FIG. 3 is a functional block diagram of system employing an exemplary digital cinema system hub of the invention.

FIG. 3 is a functional block diagram of system employing an exemplary digital cinema system hub 302.

Figure 4:
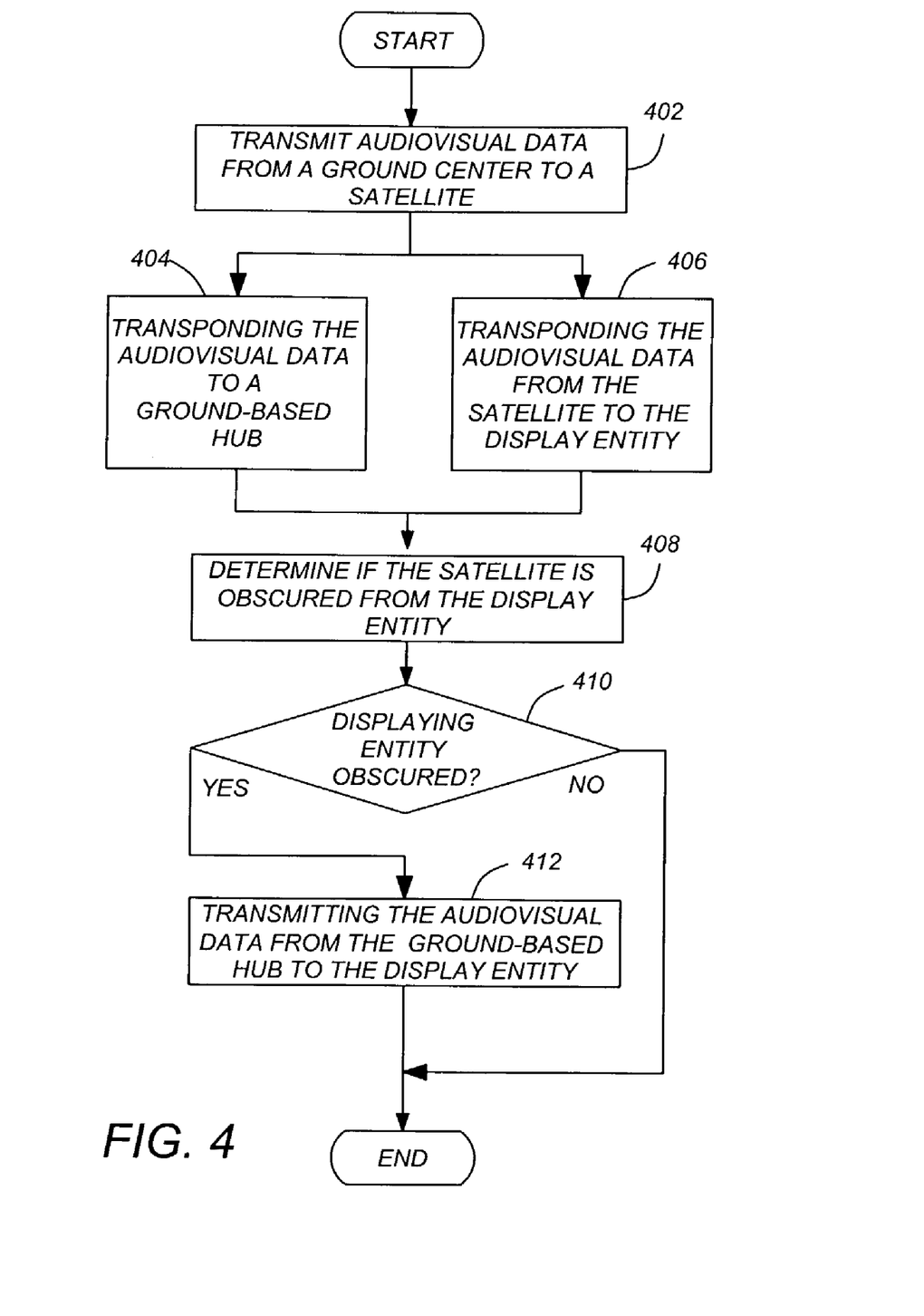
FIG. 4 is a flowchart presenting exemplary process step second he is to practice one embodiment of the present invention.

FIG. 4 is a flowchart presenting exemplary process steps used to practice one embodiment of the present invention.

Referring to FIGS. 3 and 4, audiovisual data, collectively constituting one or more media programs is transmitted from a ground center such as the NOC 106 to a satellite 150, as shown in block 402. The satellite 150 receives the audiovisual data, and transponds the audiovisual data to a ground-based hub 302 and to displaying entities 108 that are not obscured, as shown in blocks 404 and 406. The ground-based hub 302 receives the transponded audiovisual data via a hub receive antenna 306 and a hub receiver 310.

In block 408, a determination is made as to whether the satellite 150 is obscured from displaying entity 304. The satellite 150 may be obscured from the displaying entity 304 in a number of ways. For example, the displaying entity 304 may be disposed in a location wherein a terrestrial feature neat the displaying entity obscures transmissions from the satellite 150. This may occur, for example, in highly urban locations where an adjacent or nearby building obscures the satellite from their displaying entity 304. This may also occur, for example, if the view of the displaying entity's receive antenna 318 is obscured by nearby mountains or other surface features.

The satellite 150 maybe obscured from the receive antenna 318 of the displaying entity 304 by weather 320. For example, weather 320 may comprised a rainstorm which attenuates received transmissions from the satellite 150. Whether the weather 320 obscures the audiovisual data can be determined by the NOC 106 or ground-based hub 302 (from weather data), or the display entity 304 itself (from local weather data or from analysis of the received transmissions).

If the satellite 150 transmissions are not obscured from the display entity 304, the audiovisual data transponded from the satellite 150 is simply received by the display entity 304. If, however the satellite 150 transmissions are obscured from the display entity 304, the audiovisual data is transmitted from the ground-based hub 302 to the display entity 304, as shown in blocks 410 and 412. This can be accomplished via a secure landline 322 (which may comprise a copper twisted pair or optical fiber permitting transmission rates up to, but not limited to, 155 megabits per second), or via wireless link 324 by use of the ground-based hub transmitter 312, hub transmitting antenna 308, and display entity receive antenna 318. An example of applicable technology includes RF broadband technology using the Ka-Band frequency and providing DS-3 (45 megabits per second) data capabilities. The ground-based hub 302 has the capability to serve several display entities concurrently. Further, the landline 322 and wireless link 324 can be combined in a hybrid communication link.

In one embodiment, the ground-based hub 302 receives encrypted audiovisual data from the satellite 150, and decrypts the audiovisual data before transmitting it to the display entity 304. Where the communication link between the hub 302 and the display entity 304 is sufficiently secure (e.g. a dedicated secure landline) to permit transmission of the audiovisual data in unencrypted form, the audiovisual data is simply transmitted from the ground-based hub 302 to the display entity 304 without re-encryption or further encryption. However, where the communication link between the hub 302 in the display entity 304 is not sufficiently secure, the audiovisual data is either re-encrypted, or further-encrypted to assure that the audiovisual data is uncompromised during transmission. In one embodiment, the ground-based hub 302 re-encrypted data according to a different encryption algorithm than that which was used to transmit the audiovisual data from the NOC 106 to the ground-based hub 302 via the satellite 150. Since different encryption schemes are used, it becomes possible to select a security level appropriate for the vulnerability of the communication link to unauthorized intercept and the equipment available at the display entity 304. For example, if desired, information transmitted over the landline 322 may be encrypted to a lower-level security than that of the link from the satellite 150 to the hub 302, to account for the additional security provided by the landline 322 itself.

In one embodiment, the ground-based hub 302 functions much like a ground-based repeater, in that the information received from the satellite 150 is at most only temporarily cached before transmission to the display entity 304. In an alternative embodiment of the present invention, the audiovisual data is received, compiled (e.g. assembled into a complete media program using a compiler implemented by the computer 200), and stored in the memory 214 of the ground-based hub 302 before transmitting the audiovisual data to the displaying entity 304. This embodiment permits the audiovisual data of the media program to be transmitted in received at a location readily available to the displaying entity 304 (namely, the ground-based hub 302), without storing the audiovisual data in the display entity 304 itself. When the display entity 304 requires the audiovisual data in order that they media program be displayed, the display entity 304 transmits a transfer request (preferably encrypted) to the ground-based hub 302 (whether directly by landline 322 or wireless link 324, or via the NOC 106 further enhancing security. The ground-based hub 302 receives the request, and transmits the data, essentially in real time, to the display entity 304. Thus, the audiovisual data is transmitted in displayed substantially concurrently (the audiovisual data may be cached in the displaying entity).

Transmission security can also be enhanced by transmitting the audiovisual data from the satellite 150 to the ground-based hub 302 and a narrow spot beam. The spot beam provides additional security because it limits the location of any receivers intending to intercept the transmission to the area proximate the ground-based hub 302.

In a further embodiment of the present invention, the ground-based hub 302 can be used to transmit the audiovisual data to the display entity 304 as an alternative to the ordinary transmission of audiovisual data from the satellite 150 to the displaying entity 304. This embodiment is useful in circumstances where in the displaying entity receive equipment (for example satellite receiver 154 shown in FIG. 1B) is non-operational or marginally operational. While the display entity 304 could also receive the audiovisual data directly from the NOC 106, the transmission capabilities of the NOC 106 may be exceeded if an excessive number of display entities 304 are experiencing equipment failures, particularly if the audiovisual data is streamed, and not stored at the display entity 304.

In this embodiment, the display entity 304 can transmit a message (e.g. a status message) indicating whether or not the displaying facility 304 is adequately receiving the audiovisual data from the satellite 150 (the display entity 304 could be receiving no audiovisual data at all, or audiovisual data at an insufficient rate or with excessive errors). This message can be transmitted to the NOC 106 and relayed to the ground-based hub 302, or can be as transmitted directly to the ground-based hub 302. The message can also indicate, by media program chapter if necessary, which audiovisual data is being inadequately received. Upon receipt of this message, the ground-based hub 302 responds by transmitting the requested audiovisual data.

The ground-based hub 302 can also be used simply to augment the transmission capacity of the media program distribution system 100. In this embodiment, audiovisual data is transmitted to the display entity 304 by a direct link from the satellite 150 and also by the ground-based hub 302. Hence, the ground-based hub 302 can be used in high-traffic periods when the transmission capacity of the satellite 150 would otherwise be exceeded. Further, in situations where media programs are transmitted to the display entity 304 by both satellite 150 transmission and data received from the ground-based hub 302, security can be enhanced by judicious selection of which data is transmitted from which entity. For example, the media program maybe segmented into a first portion and a second portion. The first portion (e.g. 95%) of the media program can be transmitted by the satellite 150 using a first encryption technique, and a second or any remaining portion (e.g. 5%) of the media program (which can be selected to include important portions of the media program) can be transmitted by the ground-based hub 302 using a second encryption technique (more secure, if desired). Particularly in cases where link 322 is used to communicate between me ground-based hub 302 in the display entity 304, this technique can substantially increase security.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transmitting a media program comprising audiovisual data, comprising the steps of:
    (a) segmenting the media program into a first portion and a second portion;
    (b) transmitting the first portion and the second portion to a satellite;
    (c) transmitting the first portion and not the second portion from the satellite directly to a display entity via a first communication link;
    (d) transmitting the second portion from the satellite to a ground-based hub; and
    (e) transmitting the second portion from the ground-based hub to the display entity via a second communication link more secure than the first communication link and wherein steps (a)-(e) are performed during periods of high communications traffic, and wherein steps (a)-(b) and (f) are performed during periods without high communications traffic, wherein step (f) comprises transmitting the first portion and the second portion from the satellite directly to the display entity via the first communication link.

2. The method of claim 1, wherein the first portion is encrypted according to a first encryption algorithm and a second portion is encrypted according to a second encryption algorithm.

3. The method of claim 2, wherein the second encryption algorithm is more secure than the first encryption algorithm.

4. The method of claim 1, wherein the periods of high communication traffic include periods when a transmission capacity of the satellite would otherwise be exceeded by performing steps (a), (b) and (f).

* * * * *